(No Model.)

E. T. STARR.
SECONDARY BATTERY AND METHOD OF CONSTRUCTING ELECTRODES THEREFOR.

No. 295,456. Patented Mar. 18, 1884.

WITNESSES
Wm A. Skinkle,
Wm Musser.

INVENTOR
Eli T. Starr,
By his Attorney
Wm L. Peyton

UNITED STATES PATENT OFFICE.

ELI T. STARR, OF PHILADELPHIA, PENNSYLVANIA, ASSIGNOR OF ONE-HALF TO H. M. LEWIS AND JAMES W. WHITE, BOTH OF SAME PLACE, AND WILLIAM J. PEYTON, OF WASHINGTON, DISTRICT OF COLUMBIA.

SECONDARY BATTERY AND METHOD OF CONSTRUCTING ELECTRODES THEREFOR.

SPECIFICATION forming part of Letters Patent No. 295,456, dated March 18, 1884.

Application filed October 22, 1883. (No model.)

*To all whom it may concern:*

Be it known that I, ELI T. STARR, of the city and county of Philadelphia, in the State of Pennsylvania, have invented certain new and useful Improvements in Secondary Batteries and Methods of Constructing Electrodes Therefor, of which the following is a specification.

My invention relates more especially to electric batteries of that class which generate no electricity of themselves, but which, when submitted to the action of an electric current from a suitable generator passing through the battery, become charged or put into condition to give off electric currents or energy upon connecting the poles of the battery by a conductor.

The object of my invention is more particularly to improve secondary-battery elements by constructing them in a more economical manner, while producing elements capable of large storage capacity within comparatively small space.

The subject-matter claimed herein as my invention is first specifically described in detail as embodied in the best way now known to me, and then particularly pointed out at the close of the specification.

Some of my improvements may be used without the others.

Figure 1:
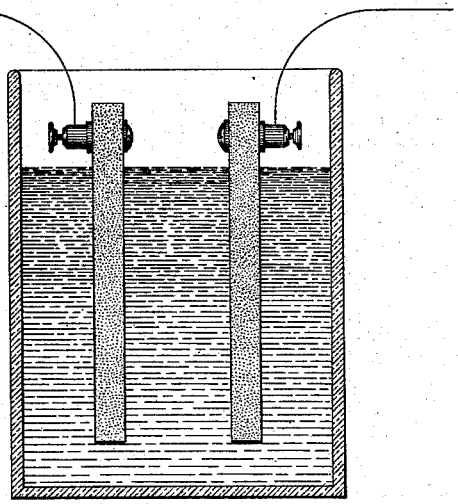
Figure 2:
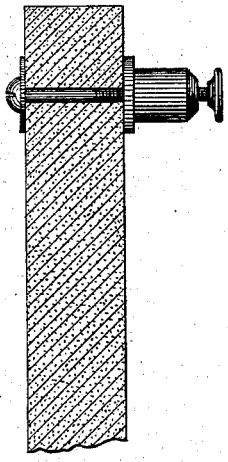

In the accompanying drawings, Figure 1 is a view in section of a secondary battery embodying elements or electrodes constructed according to my invention; and Fig. 2 is a section through one of such elements, showing one way of connecting the elements of the battery with the wires of the charging or working circuits thereof.

A secondary-battery element or electrode embodying my present invention may be constructed as follows: Take granulated or finely-divided lead and thoroughly mix it with oxide or peroxide of lead, and with a suitable quantity of mercury to convert the mass into a plastic one. The mass composed of the finely-divided lead and oxide or peroxide of lead and mercury is then placed in a mold and subjected to pressure, so as to express from the mass any excess of mercury. In a short time the composition becomes amalgamated into a hard self-sustaining but porous body. The proportions of the amalgam electrode may be in the ratio of two ounces of lead-filings to two and one-half ounces of oxide of lead, mixed with a sufficient quantity of mercury to convert the mass into a plastic one; but the proportions may of course be varied, and other ingredients may be added—such, for instance, as a small quantity of silver—to insure better effects or better amalgamation, if desired.

The above is one way by which a conglomerate mixture of lead and mercury may be formed into a very effective electrode for secondary batteries, the electrode being capable of accumulating a large amount of energy from a charging-current. I prefer the elements to be in the form of flat plates; but they may have different shapes.

In order to afford a ready means of connecting the circuit connections or wires, whether of the charging or working circuit of the battery, with the electrodes, when assembled in the battery-vessel and immersed—for instance, in dilute sulphuric acid—I preferably drill a hole into the upper end of the electrode and fasten the wires by means of a binding-screw fitted into said hole, as clearly shown in Fig. 2. It will be obvious, however, that the shape of the electrodes may be such as to afford ready means of connecting the wires, either with or without binding screws or bolts, and that the connections may be made in various well-known ways.

This application is a division of my application filed July 24, 1882, in favor of which I herein disclaim any and all patentable subject-matter of my invention, save that specifically recited in the following claims.

I claim herein as of my invention—

1. The method of constructing electric-battery electrodes hereinbefore set forth, consisting in incorporating active material in a finely-divided state with mercury, and then permitting the mixture to amalgamate and harden into a self-sustaining body, substantially as described.

2. The method of constructing electric-battery electrodes hereinbefore set forth, consisting in mixing finely-divided active matter with mercury, then subjecting the mixture to pressure in a mold to express the excess of mercury from the mixture and give shape to the electrode, and then permitting amalgamation and hardening of the mixture to take place to convert the mixture into a self-sustaining body, substantially as described.

3. The method of constructing battery-electrodes hereinbefore set forth, which consists in mixing metallic matter with mercury to form an amalgam, and then shaping the mixture in a mold while in its plastic condition.

4. The improvement in constructing electric-battery electrodes hereinbefore set forth, which consists in mixing active material with mercury to form a plastic or fluid mass, and then artificially removing a portion of the mercury.

5. The improvement in constructing and forming secondary-battery electrodes, which consists in mixing mercury with another metal or metallic compound capable of becoming active in a secondary battery to form a plastic mass, then shaping or molding said mass in a mold, and then subjecting the electrode thus formed to the action of an electric current while immersed in the electrolytic liquid of a battery-cell, substantially as described.

In testimony whereof I have hereunto subscribed my name this 11th day of October, A. D. 1883.

ELI T. STARR.

Witnesses:
WM. J. PEYTON,
JAMES YOUNG.